United States Patent
Krinsky et al.

(10) Patent No.: US 10,027,803 B2
(45) Date of Patent: Jul. 17, 2018

(54) ENHANCED AUTOMATED ATTENDANT SYSTEM

(71) Applicants: AT&T MOBILITY II LLC, Atlanta, GA (US); AT&T INTELLECTUAL PROPERTY I, L.P., Atlanta, GA (US)

(72) Inventors: Jeffrey Krinsky, Woodinville, WA (US); Jennifer Yates, Morristown, NJ (US)

(73) Assignees: AT&T INTELLECTUAL PROPERTY I, L.P., Atlanta, GA (US); AT&T MOBILITY II LC, Atlanta, GA (US)

( * ) Notice: Subject to any disclaimer, the term of this patent is extended or adjusted under 35 U.S.C. 154(b) by 0 days.

(21) Appl. No.: 14/974,292

(22) Filed: Dec. 18, 2015

(65) Prior Publication Data
US 2017/0180552 A1 Jun. 22, 2017

(51) Int. Cl.
*H04M 3/51* (2006.01)
*H04M 3/42* (2006.01)
*H04M 3/523* (2006.01)

(52) U.S. Cl.
CPC ..... *H04M 3/5158* (2013.01); *H04M 3/42365* (2013.01); *H04M 3/5166* (2013.01); *H04M 3/5231* (2013.01)

(58) Field of Classification Search
CPC ............. H04M 3/5231; H04M 3/5166; H04M 3/5233; H04M 3/42365; H04M 3/5158
See application file for complete search history.

(56) References Cited

U.S. PATENT DOCUMENTS

| 7,257,552 B1* | 8/2007 | Franco | G06Q 10/08 |
| | | | 705/26.2 |
| 7,274,787 B1* | 9/2007 | Schoeneberger | H04M 3/5231 |
| | | | 379/265.01 |
| 7,983,401 B1 | 7/2011 | Krinsky | |
| 8,155,297 B1* | 4/2012 | Dhir | H04M 3/42195 |
| | | | 379/210.01 |

(Continued)

OTHER PUBLICATIONS

"Videlica Platforms," Veidelica, videlica.com, accessed: Oct. 2015, http://www.videlica.com/solutions/, 8 pages.

(Continued)

*Primary Examiner* — Lisa Hashem
(74) *Attorney, Agent, or Firm* — Toler Law Group, PC

(57) ABSTRACT

A method includes determining, at a processor of an automated attendant system, whether a customer service representative is available to speak with a caller. The method also includes scheduling a call back time in response to a determination that the customer service representative is not available to speak with the caller. The call back time indicates a time where the customer service representative will call the caller. The method further includes providing the call back time to the caller and receiving an availability flag from the caller at the call back time. The availability flag indicates whether the caller is available to receive a call from the customer service representative. The method also includes providing a call back signal to the customer service representative based on the availability flag. The call back signal indicates to the customer service representative whether to call the caller at the call back time.

20 Claims, 9 Drawing Sheets

(56) References Cited

U.S. PATENT DOCUMENTS

| | | | |
|---|---|---|---|
| 8,532,283 B1* | 9/2013 | Haggerty | H04M 3/5183 |
| | | | 379/114.13 |
| 8,600,019 B1 | 12/2013 | Cooper et al. | |
| 8,661,112 B2 | 2/2014 | Creamer et al. | |
| 8,705,725 B1* | 4/2014 | Zettner | H04M 3/5231 |
| | | | 379/210.01 |
| 8,767,928 B2 | 7/2014 | Springer | |
| 8,798,240 B2 | 8/2014 | Awad et al. | |
| 8,929,517 B1 | 1/2015 | Lavian et al. | |
| 8,958,532 B2 | 2/2015 | Kritt et al. | |
| 8,958,542 B1* | 2/2015 | Kaufman | H04M 3/00 |
| | | | 379/265.11 |
| 9,008,285 B2 | 4/2015 | Abel | |
| 9,049,295 B1 | 6/2015 | Cooper et al. | |
| 9,100,478 B1 | 8/2015 | Benway et al. | |
| 9,143,614 B2 | 9/2015 | Williams | |
| 9,143,884 B2 | 9/2015 | Madhavapeddi et al. | |
| 9,247,065 B2* | 1/2016 | Walls | H04M 3/5233 |
| 9,749,471 B2* | 8/2017 | Charlson | H04M 3/5232 |
| 2009/0285380 A1* | 11/2009 | Chen | H04M 3/5231 |
| | | | 379/210.01 |
| 2010/0283613 A1* | 11/2010 | Palin | H04L 12/2809 |
| | | | 340/572.1 |
| 2011/0091030 A1* | 4/2011 | Bhat | H04M 3/5141 |
| | | | 379/265.09 |
| 2014/0044254 A1* | 2/2014 | Chinnappa | H04M 3/5231 |
| | | | 379/265.12 |
| 2014/0134968 A1* | 5/2014 | Raouf | H04M 1/663 |
| | | | 455/404.1 |
| 2014/0153703 A1* | 6/2014 | Desai | H04M 3/5166 |
| | | | 379/88.01 |
| 2014/0270108 A1 | 9/2014 | Riahi et al. | |
| 2014/0273991 A1* | 9/2014 | Lindsay | H04M 3/00 |
| | | | 455/414.1 |
| 2015/0049869 A1* | 2/2015 | Petrovykh | H04M 3/5158 |
| | | | 379/265.09 |
| 2015/0054910 A1* | 2/2015 | Offen | H04M 3/42059 |
| | | | 348/14.02 |
| 2016/0065738 A1* | 3/2016 | Schwartz | G06Q 30/016 |
| | | | 379/265.03 |
| 2016/0205244 A1* | 7/2016 | Dvortsov | H04M 3/42365 |
| | | | 455/413 |
| 2016/0277569 A1* | 9/2016 | Shine | H04M 3/42365 |
| 2016/0330131 A1* | 11/2016 | Matula | H04L 47/762 |
| 2017/0019531 A1* | 1/2017 | Janefalkar | H04M 3/42042 |
| 2017/0214797 A1* | 7/2017 | Dhir | H04M 3/5231 |

OTHER PUBLICATIONS

Kumar, A., "Research: Emotion Recognition in Interactive Voice Response Systems," Carnegie Mellon Univ., cs.cmu.edu, 2013, http://www.cs.emu.edu/'anujk1/research. html, 2 pages.

Mitchell, N., "Why IVR is Integral to Digital Customer Engagement," My Customer, mycustomer.com, Aug. 22, 2014. http://www.mycustomer. com/blogs-post/why-ivr-i nteg ra 1-d ig ita l-customerengagement/I67850, 4 pages.

* cited by examiner

ENHANCED AUTOMATED ATTENDANT SYSTEM

FIELD OF THE DISCLOSURE

The present disclosure is generally related to an automated attendant system.

BACKGROUND

To provide support to current or prospective customers, employees, and suppliers, many businesses offer telephone numbers that individuals can call for such support. For example, customer service numbers can be utilized to pay bills, receive technical support, purchase products or services, cancel or change services, update user information such as an address, and various other tasks. In the past, these numbers were routed to a plurality of lines, where human beings were employed to personally answer telephones, answer questions, and route phone calls. Access to these telephone lines, however, was typically limited to business hours, as it is expensive to employ individuals to monitor phones for twenty-four hours a day, seven days a week. Also, it is expensive to have enough staff to handle peak demands. This is problematic for customers or prospective customers who have a small time window within which they can make telephone calls. For instance, if an individual has a technical question regarding a television, yet must be at a place of employment at a substantially similar time that the customer service line is available, it may be difficult to ask appropriate questions or take action while not proximate to the television.

As technology has advanced, automated telephone attendants have been used with customer service telephone lines. Automated attendants enable businesses to offer twenty-four hour support on several topics deemed important by the businesses. For example, customer support telephone lines associated with large banks typically allow a user, through use of an automated attendant, to check account balances, transfer money between accounts, make payments on loans with the bank, and perform other common tasks. Generally, users can provide feedback to the automated attendant and/or make selections by voice commands or pressing particular buttons on a touch-tone telephone. In other words, callers can traverse through a menu by providing feedback to questions or options provided by the automated attendant. If the automated attendant is not able to provide the particular support desired by the user, the user can then be transferred to a person at a call center for further assistance. In some scenarios, call agents may be busy with other callers and the automated attendant may provide the user with a time when a person at the call center will contact the user. If the user is busy at the time, the user may miss the call and have to start over with the entire process. For example, if the user is on an important call when the person at the call center calls the user, the user may not be able to talk with the person at the call center and may have to dial into the automated attendant to restart the call support process.

DETAILED DESCRIPTION

Figure 1:
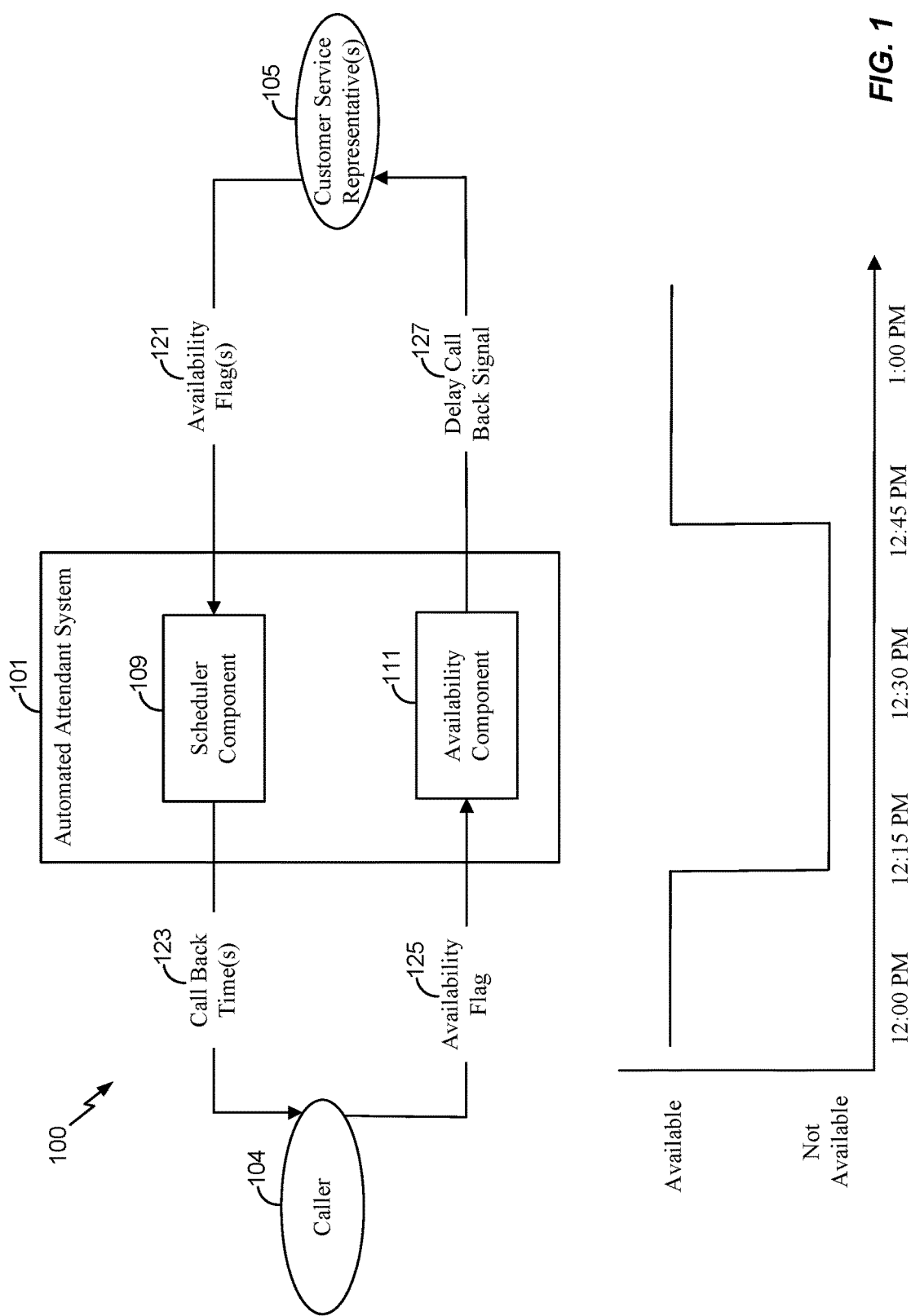
FIG. 1 illustrates a system for updating a call back time based on a caller's availability.

According to the techniques described herein, a method includes determining, at a processor of an automated attendant system, whether a customer service representative is available to speak with a caller. The method also includes scheduling a call back time in response to a determination that the customer service representative is not available to speak with the caller. The call back time indicates a time, multiple times, or one or more time windows when the customer service representative is scheduled to call the caller. The method further includes providing the call back time to the caller and receiving an availability flag from the caller at the call back time. The availability flag indicates whether the caller is available to receive a call from the customer service representative. The method also includes providing a call back signal to the customer service representative based on the availability flag. The call back signal indicates to the customer service representative whether to call the caller at the call back time.

According to the techniques described herein, an automated attendant system includes a processor and a memory storing instructions that are executable by the processor to perform operations. The operations include determining whether a customer service representative is available to speak with a caller and scheduling a call back time in response to a determination that the customer service representative is not available to speak with the caller. The call back time indicates a time, multiple times, or one or more time windows when the customer service representative is scheduled to call the caller. The operations further include providing the call back time to the caller and receiving an availability flag from the caller at the call back time. The availability flag indicates whether the caller is available to receive a call from the customer service representative. The operations also include providing a call back signal to the customer service representative based on the availability flag. The call back signal indicates to the customer service representative whether to call the caller at the call back time.

According to the techniques described herein, a computer-readable storage device includes instructions that, when executed by a processor of an automated attendant system, cause the processor to perform operations. The operations include determining whether a customer service representative is available to speak with a caller and scheduling a call back time in response to a determination that the customer service representative is not available to speak with the caller. The call back time indicates a time, multiple times, or one or more time windows when the customer service representative is scheduled to call the caller. The operations further include providing the call back time to the caller and receiving an availability flag from the caller at the call back time. The availability flag indicates whether the caller is available to receive a call from the customer service representative. The operations also include providing a call back signal to the customer service representative based on the availability flag. The call back signal indicates to the customer service representative whether to call the caller at the call back time.

FIG. 1 illustrates a system 100 for updating a call back time based on a caller's availability. The system 100 includes an automated attendant system 101. The automated attendant system 101 includes a scheduler component 109 and an availability component 111. According to one implementation, the automated attendant system 101 may include one or more components of one or more of the systems 300-600 of FIGS. 3-6, as described below.

If a caller 104 elects (from menu options) to speak with a customer service representative 105 (e.g., a person at a call center), the automated attendant system 101 may determine whether there is an available customer service representative 105 to speak with the caller 104. For example, the automated attendant system 101 may poll each customer service representative 105 to determine whether there is a customer service representative 105 that is available (e.g., not on the line with another caller). In response to the poll, each customer service representative 105 (or a processor associated with a telephone of each customer service representative 105) may provide an availability flag 121 to the scheduler component 109 of the automated attendant system 101. Each availability flag 121 indicates whether a corresponding customer service representative 105 is available to speak with the caller 104. If an availability flag 121 indicates that a customer service representative 105 is available to speak with the caller 104, the scheduler component 109 may transfer the caller 104 to the customer service representative 105.

However, if each availability flag 121 indicates that the corresponding customer service representative 105 is not available to speak with the caller 104, the scheduler component 109 may determine a time for a customer service representative 105 to call the caller 104 back. For example, based on historical data, the scheduler component 109 may estimate a call back time 123 that indicates when a customer service representative 105 will be available to call the caller 104 back. As used herein, the call back time 123 may indicate a time, multiple times, or one or more time windows when the customer service representative 105 is scheduled to call the caller. The scheduler component 109 may audibly provide the call back time 123 to the caller 104 and/or visually provide the call back time 123 to the caller 104 via the user interface 132. After receiving the call back time 123 from the scheduler component 109, the caller 104 may disconnect (e.g., "hang up") from the automated attendant system 101 and await a call back from a customer service representative 105 at the call back time 123.

In some scenarios, the caller 104 may be busy at the call back time 123 and may not be able to accept a call from the customer service representative 105. As a non-limiting example, the call back time 123 may be 12:30 pm. If the caller 104 is on an important telephone call (e.g., a call with his/her boss, a family member, etc.), then the caller 104 may not be able to accept the call from the customer service representative 105 at 12:30 pm. For example, according to the timing diagram illustrated in FIG. 1, the caller 104 may be available from 12:00 pm until 12:15 pm. However, at 12:15 pm, the caller 104 may receive (or initiate) a telephone call. According to the timing diagram, the telephone call may have a thirty minute duration and last until approximately 12:45 pm. Thus, the caller 104 may not be available at the call back time 123 (e.g., 12:30 pm) and a customer service representative 105 may call the caller 104 during other time slots (e.g., after 12:45 pm).

Instead of missing the call from the customer service representative 105 and having to restart the process of calling into the automated attendant system 101, the caller 104 (or a processor associated with a telephone of the caller 104) may send an availability flag 125 to the availability component 111 of the automated attendant system 101 to indicate whether the caller 104 is available to receive the call from the customer service representative 105 at the call back time 123. The availability flag 125 (e.g., an availability indicator) may be determined based on a calendar integrated into the caller's 104 telephone and/or based on ad-hock calls. The availability flag 125 may be sent to the automated attendant system 101 using out-of-band signaling or using in-band signaling. If the availability flag 125 has a first value, the availability flag 125 may indicate that the caller 104 is unavailable to receive a call from the customer service representative 105. As a result, the availability component 111 may generate a delay call back signal 127 that indicates to the customer service representative 105 to call the caller 104 back at a later time. If the availability flag 125 has a second value, the availability flag 125 may indicate that the caller 104 is available to receive the call from the customer service representative 105 and the customer service representative 105 may call the caller 104. The value of the availability flag 125 may be based on a determination of whether a telephone associated with the caller 104 is "busy" (e.g., in a call session) and/or based on a telephone number in which the telephone is connected. According to one implementation, the availability flag 125 may have the first value if the telephone is busy and may have the second value if the telephone is not busy. According to another implementation, the availability flag 125 may have the first value if the telephone is busy and the telephone number in which the telephone is connected has been indicated as an "important" telephone number by the caller 104. Otherwise, the availability flag 125 may have the second value.

Because the caller 104 may be on the telephone at the call back time 123, the availability flag 125 may be sent using out-of-band signaling to reduce call disruption. According to one implementation, the value of the availability flag 125 may be mapped to contacts on the telephone of the caller 104. For example, the caller 104 may indicate whether a contact is "important" or "unimportant". If the caller 104 is on the telephone with an important contact at the call back time 123, the availability flag 125 may have the first value (indicating that the caller 104 is unavailable to receive the call from the customer service representative 105). The availability flag may be set by a processor within the telephone of the caller 104 based on the determination of whether the telephone associated with the caller 104 is "busy" (e.g., in a call session) and/or based on the telephone number in which the telephone is connected. If the caller 104 is on the telephone with an unimportant contact at the call back time 123, the availability flag 125 may have the second value (indicating that the caller is available to receive the call from the customer service representative 105).

Figure 2:
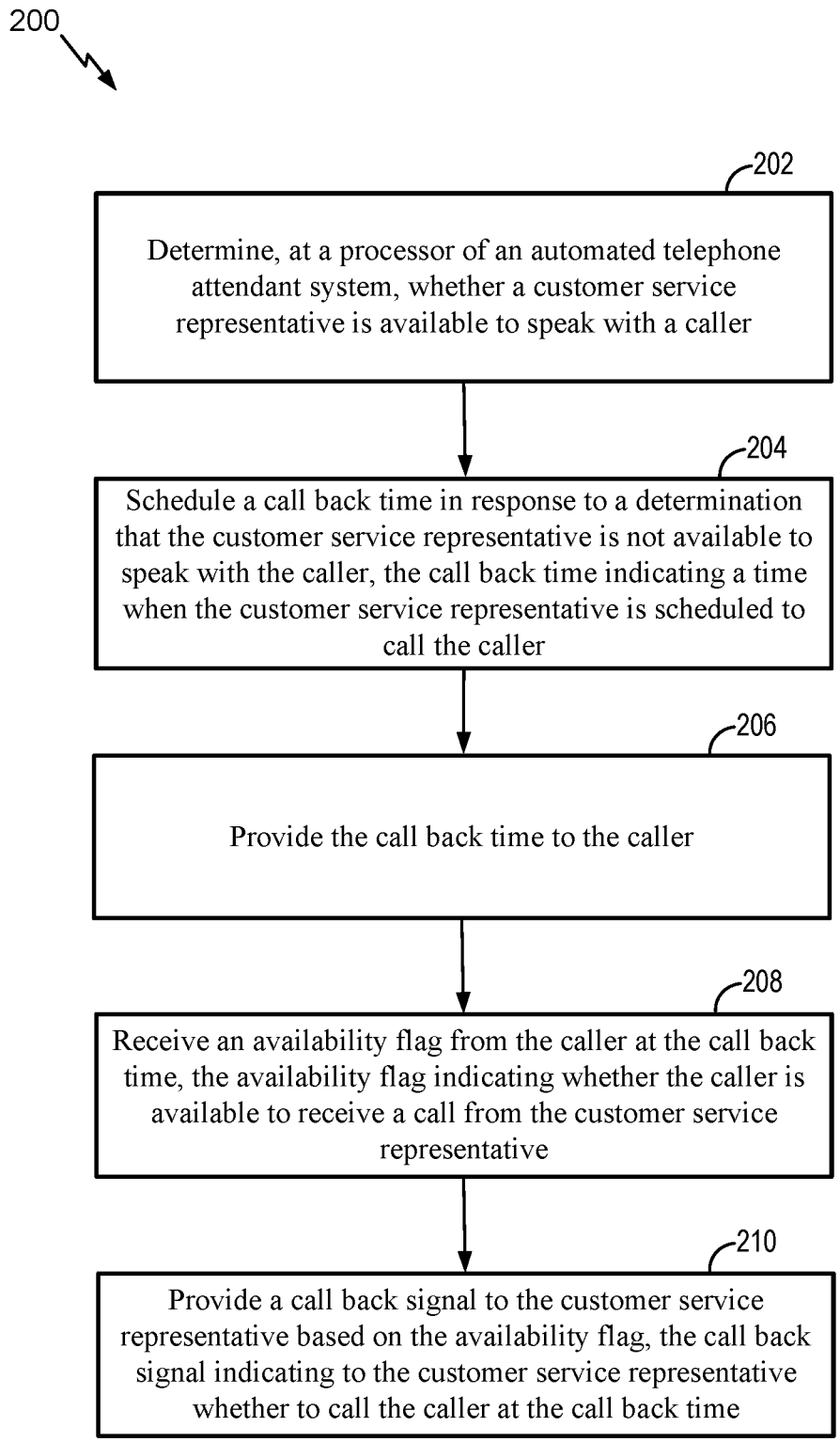
FIG. 2 illustrates a method for updating a call back time based on a caller's availability.

FIG. 2 illustrates a method 200 for updating a call back time based on a caller's availability. The method 200 may be performed using the system 100 of FIG. 1, the system 200 of FIG. 2, the system 300 of FIG. 3, the system 400 of FIG. 4, the system 100 of FIG. 6, or a combination thereof. The method 200 may also be used in conjunction with the method 700 of FIG. 7.

The method 200 includes determining, at a processor of an automated attendant system, whether a customer service representative is available to speak with a caller, at 202. For example, referring to FIG. 1, the automated attendant system 101 may determine whether a customer service representative 105 is available to speak with the caller 104 based on the availability flag 121. The availability flag 121 may indicate whether the customer service representative 105 is available to speak with the caller 104.

A call back time may be scheduled in response to a determination that the customer service representative is not available to speak with the caller, at 204. The call back time may indicate a time when the customer service representative is scheduled to call the caller. For example, referring to FIG. 1, the scheduler component 109 may determine a time for a customer service representative 105 to call the caller 104 back. To illustrate, based on historical data, the scheduler component 109 may estimate the call back time 123 that indicates when a customer service representative 105 will be available to call the caller 104 back.

The call back time may be provided to the caller, at 206. For example, referring to FIG. 1, the scheduler component 109 may audibly provide the call back time 123 to the caller 104 and/or visually provide the call back time 123 to the caller 104 via the user interface 132. After receiving the call back time 123 from the scheduler component 109, the caller 104 may disconnect (e.g., "hang up") from the automated attendant system 101 and await a call back from a customer service representative 105 at the call back time 123.

An availability flag may be received from the caller at the call back time, at 208. The availability flag may indicate whether the caller is available to receive a call from the customer service representative. The availability flag may be set by a processor within the telephone of the caller 104 based on the determination of whether the telephone associated with the caller 104 is "busy" and/or based on the telephone number in which the telephone is connected. For example, referring to FIG. 1, the caller 104 may send the availability flag 125 to the availability component 111 of the automated attendant system 101 to indicate whether the caller 104 is available to receive the call from the customer service representative 105 at the call back time 123. For example, if the availability flag 125 has a first value, the availability flag 125 may indicate that the caller 104 is unavailable to receive a call from the customer service representative 105. As a result, the availability component 111 may generate a delay call back signal 127 that indicates to the customer service representative 105 to call the caller 104 back at a later time. If the availability flag 125 has a second value, the availability flag 125 may indicate that the caller 104 is available to receive the call from the customer service representative 105 and the customer service representative 105 may call the caller 104.

A call back signal may be provided to the customer service representative based on the availability flag, at 210. The call back signal may indicate to the customer service representative whether to call the caller at the call back time. For example, referring to FIG. 1, the availability component 111 may generate the delay call back signal 127 that indicates to the customer service representative 105 to call the caller 104 back at a later time (if the availability flag has the first value). If the availability flag 125 has a second value, the availability flag 125 may indicate that the caller 104 is available to receive the call from the customer service representative 105 and the customer service representative 105 may call the caller 104. According to some implementations, the availability flag 125 may indicate a range of values. For example, the availability flag 125 may indicate whether the caller 104 is on a telephone call at the call back time 123 and may indicate an importance of the telephone call based on other participants. To illustrate, if the caller 104 is on a telephone call with a friend, the availability flag 125 may indicate that the call is "not important". However, if the caller 104 is on a telephone call with a boss, the availability flag 125 may indicate that the call is "important".

According to one implementation, the caller 104 may have a wearable device, such as a watch, that communicates with a telephone of the caller 104. A distance between the telephone and the wearable device may be determined based on wireless signaling and the availability flag 125 may be based on the distance. For example, if the distance is greater than a threshold (e.g., 15 feet), the availability flag 125 may indicate to the customer service representative 105 to call the caller 104 back at a later time. According to another implementation, the telephone may indicate a location of the caller 104 based on global positioning system (GPS) coordinates. Based on the location, the availability flag 125 may indicate whether the caller 104 is available to receive a call. For example, if the caller 104 is not near his/her home or work desk, the availability flag 125 may indicate that the caller is not available to receive a call from a customer service representative 105.

According to one implementation, the availability flag may be received using out-of-band signaling. For example, the availability flag may be received via a web interface. The availability flag may indicate that the caller is available to receive the call if a telephone of the caller is not associated with a call session at the call back time. The availability flag may indicate that the caller is not available to receive the call if a telephone of the caller is associated with a call session at the call back time. If a telephone of the caller is associated with a call session at the call back time, an indication associated with the availability flag may be based on a priority value associated with a participant of the call session. For example, if the caller indicates that the participant is a "low priority" participant (e.g., indicates that the call session is not important), the availability flag may indicate that the caller is available to receive the call from a customer service representative at the call back time. If the caller indicates that the participant is a "high priority" participant (e.g., indicates that the call session is important), the availability flag may indicate that the caller is not available to receive the call from the customer service representative at the call back time. The caller may indicate the priority of the participant by assigning priority indicators to contacts in the caller's telephone. Contacts without an assigned priority indicator may be designated as "low priority" contacts.

Figure 3:
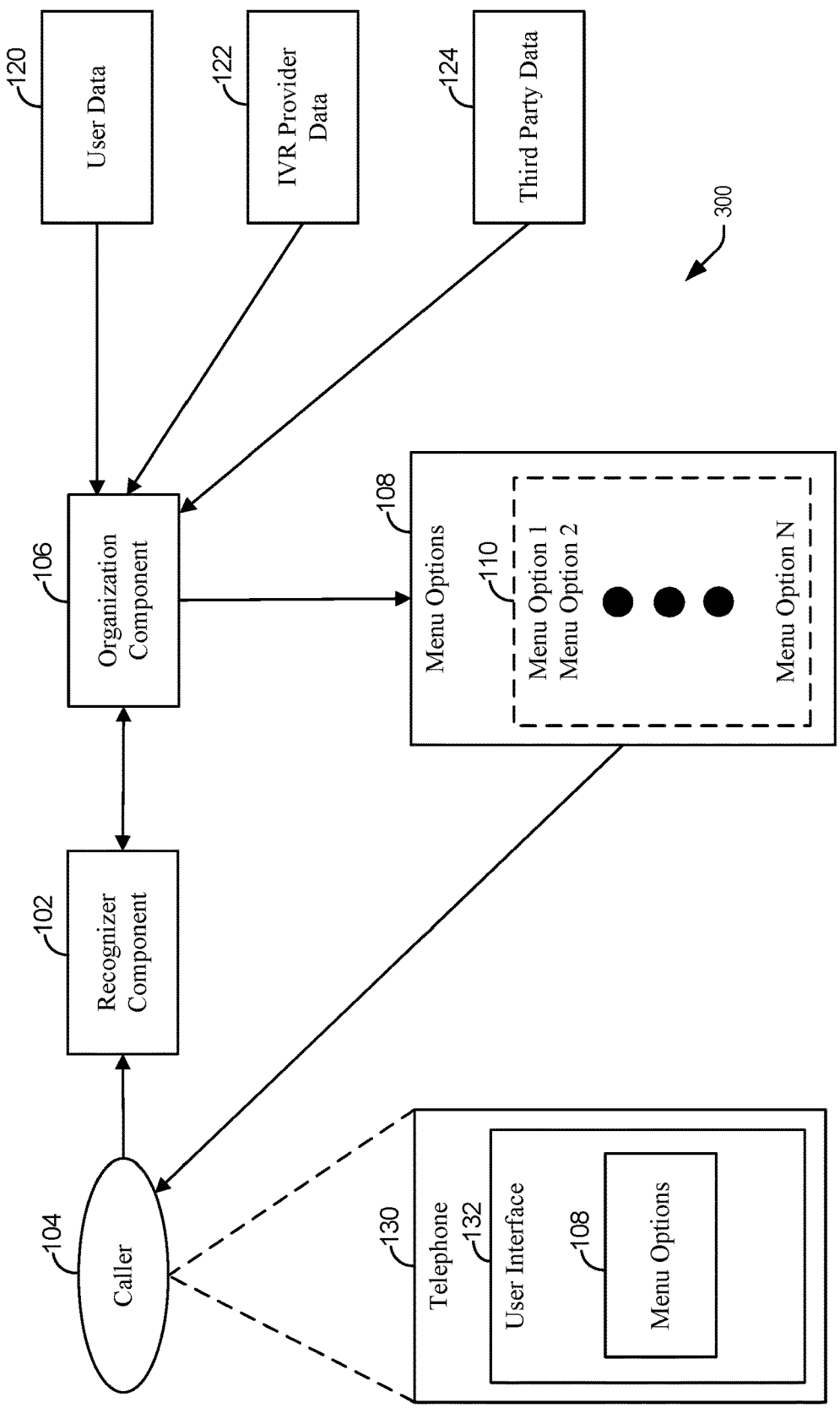
FIG. 3 illustrates a system that connects a caller with a customer service line and provides menu options to the caller in an order customized for the caller.

FIG. 3 illustrates a system 300 that connects a caller with a customer service line and provides menu options to the caller in an order customized for the caller, thereby reducing an amount of time that the caller is on the telephone. The system 300 includes a recognizer component 102 that can recognize information associated with a caller 104 to a customer service line. Such information may include a location of the caller 104, demographic information associated with the caller 104, an identity of the caller 104, etc. For instance, the caller 104 may be calling for technical support, to pay a bill, to purchase an item or service, etc. Additionally, the caller 104 may be a recipient of a call from an automated attendant (rather than calling in to an automated attendant). Conventionally, the caller 104 is provided with a plurality of menu options in a predefined order, and some menu options may be nested. For example, for the caller 104 to reach a desired menu option, the caller 104 often must listen to a plurality of menu options that are unrelated to the caller's purpose for contacting customer service. The system 300 overcomes some of these deficiencies by providing the caller 104 with menu options that are in a customized order, where the caller 104 can predefine the menu options and order, the menu options and order can be inferred given knowledge of parameters associated with the caller 104 and other users of the system 300, or a combination thereof.

As stated above, the recognizer component 102 can, upon receipt of a call, determine an identity of the caller 104 through, for example, analysis of information within a caller identification line and/or utilization of voice analysis techniques. Still further, the recognizer component 102 may request and analyze personal identification numbers, account numbers, usernames, passwords, biometric indicia (such as fingerprint data obtainable through a scanning mechanism, a voice print, retinal scan, facial recognition, etc.), and other suitable information that can be utilized to identify the caller 104. Additionally, the recognizer component 102 can utilize any combination of the aforementioned techniques in connection with discerning the identity of the caller 104.

Moreover, the recognizer component 102 may receive/ascertain other information from the caller 104, such as a type of phone that the caller 104 is employing to contact the customer service number, a location of the caller 104, and other suitable information. As another non-limiting example, the recognizer component 102 may use big data techniques to determine that the caller 104 is most likely calling about a particular subject (e.g., a power outage, a software/firmware bug, etc.). The recognizer component 102 relays information about the caller to an organization component 106, which outputs one or more menu options 108. The menu options 108 may include a plurality of menu options 110 that are customized based at least in part upon the information. For example, menu options relevant to the location of the caller 104 may be presented prior to menu options that are not relevant to the location of the caller 104. If the caller 104 has not utilized the system 300 previously, the organization component 106 can provide the caller 104 with default menu options in a default order (or use other information, such as location, to determine menu options and to order the menu options).

To determine which menu options to provide to the caller 104 and in what particular order, the organization component 106 can, for instance, utilize a rules-based (pre-programmed) approach, computational intelligence methods, data mining, neural networks, machine learning, expert-based systems, etc. For example, upon receiving the identity of the caller 104, the organization component 106 may determine which menu options to provide to the caller 104 and in what order to provide the menu options. This determination may be based upon preferences explicitly provided by the caller 104 (e.g., through a web interface, through voice commands, through a conversation with a human operator, etc.). Rules can also be automatically initiated for certain caller parameters, such as caller age, caller location, caller demographics, caller metadata, etc. For example, rules may be implemented for female callers who are between thirty and forty years old and calling from a particular location. Additionally or alternatively, the organization component 106 may analyze caller history, caller context, and other user-centric data and may perform a statistical analysis to determine preferences of the caller 104 with respect to menu options provided by an automated telephone attendant. For example, based upon previous calls by the caller 104 and/or other callers, it may be determined that a user is likely to choose a particular menu option.

A menu provided by an automated telephone attendant can be structured to first present three menu options, such as an option for technical support, an option for purchasing services, and an option for paying monthly bills. Upon selection of one of these options, several other options can be provided to the caller 104. For example, if the caller 104 selects the option to pay monthly bills, an option for paying by debit card and an option for paying by credit card can be provided to the caller 104 (in that order). If the caller 104 selects the option to pay by credit card, options relating to credit card type can be provided. Thus, if the caller 104 simply wishes to pay their bill by a particular credit card, they must nevertheless traverse through a plurality of menu options, many of which are unrelated to the caller's purpose for contacting customer service. In contrast, the organization component 106 can analyze explicitly provided information and can output menu options to the caller 104 based upon the information. Additionally or alternatively, the organization component 106 can infer menu options to provide to the caller 104 given certain data. For instance, the organization component 106 can initially provide the caller 104 with an option to pay a bill by way of a particular credit card (based on information stored in a database) as well as an option to be provided with a main (default) menu. Thus, rather than being forced to navigate through several non-relevant options, the caller 104 may be quickly provided with highly relevant menu options.

According to one implementation, the organization component 106 may be configured to perform an analysis to determine targeted announcements, advertisements, interactive voice response (IVR) messages, or a combination thereof, to provide to the caller 104 in the form of menu options 108. The analysis may be based on user data 120, IVR provider data 122, and third party data 124. The user data 120 may include past requests (or choices) of the caller 104 when the caller 104 has previously accessed the system 300, a job function of the caller 104, a location of the caller 104, demographic information of the caller 104, etc. For example, the user data 120 may include caller-specific information that is provided to the organization component 106 that enables the organization component 106 to determine menu options 108 to provide to the caller 104. The IVR provider data 122 may include time-sensitive data that may be of interest to the caller 104. As non-limiting examples, the IVR provider data 122 may include outage information from a service provider, information about an overstock item offered at a discount from a retailer, etc. The third party data 124 may include local information from third-party sources, such as a news outlet, that may enable the organization component 106 to access the reason for the call. As a non-limiting example, if the system 300 is for a retail store, the third party data 124 may include weather information used by the organization component 106 to determine whether the menu options 108 should include information about sun block, umbrellas, shovels, etc.

Based on the data 120, 122, 124, the organization component 106 may generate menu options 108, and the menu options 108 may be provided to the caller 104. Because the menu options 108 are based on user data 120 that is specific to the caller 104 and based on data 122, 124 that the organization component 106 determines to be most relevant based on current conditions (e.g., time, weather, etc.), there is a relatively high likelihood that the menu options 108 presented to the caller 104 will be relevant, which may reduce the amount of time that the caller 104 is on a telephone 130.

According to one implementation, the menu options 108 may be audibly provided to the caller 104. For example, an automated telephone attendant may audibly instruct the caller 104 to press "1" on a keypad of the telephone 130 to select Menu Option "1", to press "2" on the keypad to select Menu Option "2", etc. Additionally or alternatively, the menu options 108 may be visually provided to the caller 104. For example, the telephone 130 of the caller may include a user interface 132. The system 300 may provide a signal to the telephone 130 to visually display the menu options 108 at the user interface 132. As a result, the caller 104 may bypass waiting for the automated telephone attendant to audibly state each Menu Option and may select the desired Menu Option using the user interface 132.

It is to be understood that the techniques described herein can be utilized in other arenas (e.g., wherever menu options are employed). For instance, menu options at a drive through restaurant can be provided to an individual based upon the individual's identity and/or a parameter associated with the individual (such as age of the individual, type of vehicle the individual is using, etc.). More particularly, menu options can be provided and ordered through analysis of user history, context, demographic information, time of day, day of week, season, news, current events, and other factors. To illustrate, if a user has previously accessed a call center and inquired about credit card payments towards the end of a month, menu options related to credit card payments may be provided to the user towards the end of the next month if the user accesses the call center.

In another example, a vending machine can provide digital options based upon known or inferred user preferences. As another example, a self-serve fuel pump may pre-select user preferences such as grade of fuel, whether a physical receipt is desired, etc. In these examples, a portable telephone or other suitable device can relay information about the user through use of a near-field communications protocol, and the menu options can be provided based at least in part upon information provided through use of the portable device. To illustrate, the telephone 130 may relay "preferred" snack and/or drink options to the vending machine via a near-field communications protocol, and the vending machine may provide digital options to the user based on the options provided by the telephone 130.

Still further, menus on Internet pages can be selectively provided to a user such that menu options the user is most likely to prefer are displayed prominently while menu options the user is least likely to prefer are displayed less prominently or hidden. Such determination can be made for various levels of menu options. Additionally, advertising content can be provided, where the advertising content can correspond to menu options that are likely to be selected by the user. In still another example, menus provided by automated teller machines can be automatically provided and arranged based at least in part upon parameters associated with a user and/or user identification.

Figure 4:
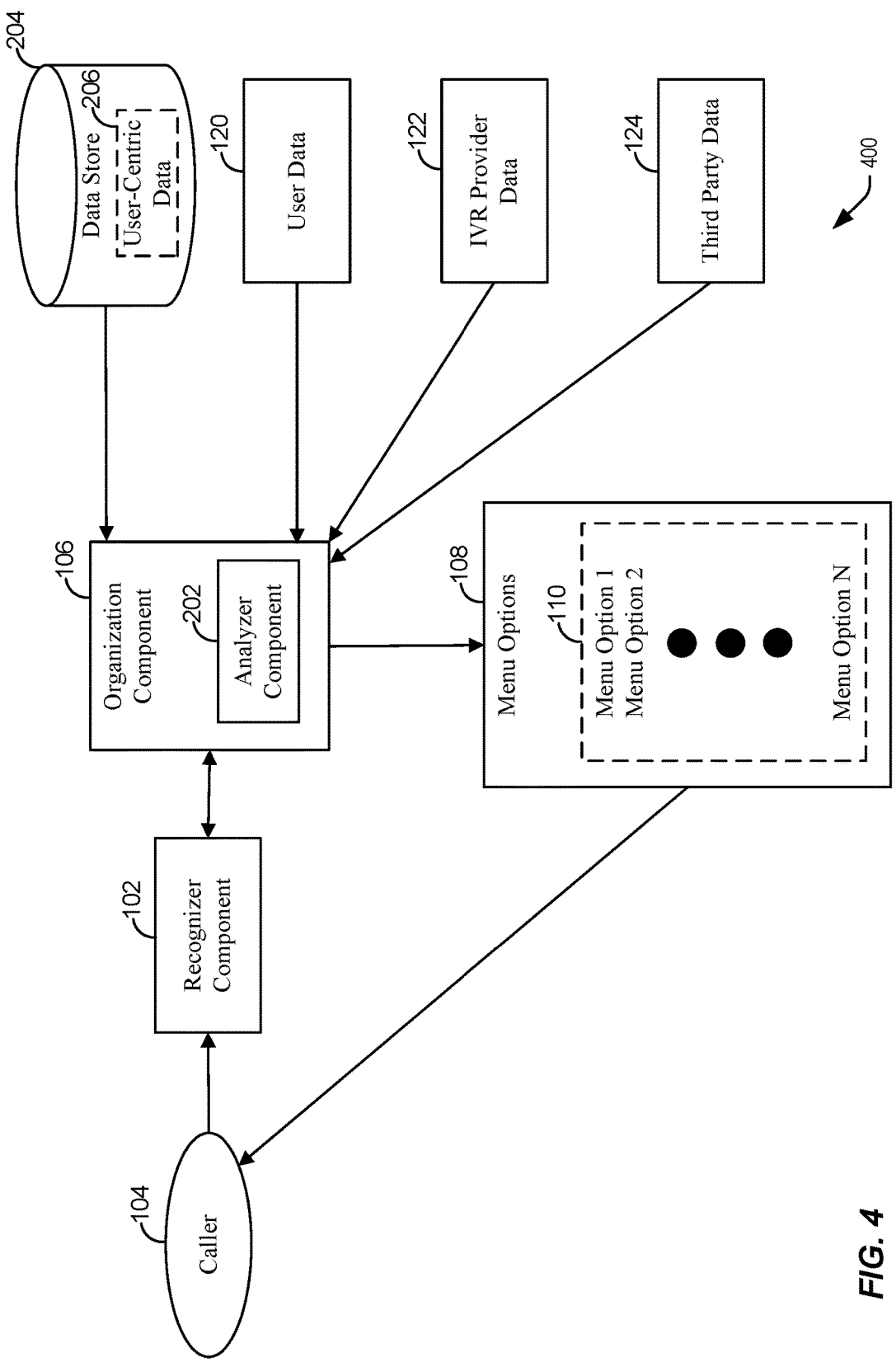
FIG. 4 illustrates a system that can be utilized in connection with an automated telephone attendant to selectively provide menu options and structure(s) to callers.

FIG. 4 illustrates a system 400 that can be utilized in connection with an automated telephone attendant to selectively provide menu options and structure(s) to callers. The system 400 includes the recognizer component 102 that receives a call from the caller 104 (or initiates a call to the caller 104), where the caller 104 is in contact with a number for customer service/support. The recognizer component 102, upon being connected to the caller 104, can ascertain information related to the caller 104 (such as identity, age, location, etc.). The ascertained information can be relayed to an analyzer component 202 that is associated with the organization component 106, and the analyzer component 202 can access a data store 204 that includes user-centric data 206. For example, the user-centric data 206 may include specific requests for menu options and/or structures provided by the caller 104. Therefore, once the information of the caller 104 is determined, the analyzer component 202 may quickly determine what menu options 110 to provide to the caller 104 and an order of such menu options 110.

The caller 104 may provide information to the data store 204 regarding menu option preferences. For example, the caller 104 may state that they would like to be provided with an option to pay a bill by way of a certain credit card if they call the customer service line within three days of an end of a billing cycle. Thus, the caller 104 can generate rules that can be retained within the data store 204 and utilized by the organization component 106 when the caller 104 is identified by the recognizer component 102. Absent explicitly provide rules, the analyzer component 202 may review the user-centric data 206 and make probabilistic determinations based at least in part on the user-centric data 206. For example, the analyzer component 202 may determine that three out of the last four times the caller 104 has utilized the automated telephone attendant, the caller 104 has traversed through certain menu options. The analyzer component 202 may determine that the caller 104 is likely to utilize the menu options that were historically selected by the caller 104, and the organization component 106 may output the menu options 110 to reflect the determination.

The analyzer component 202 may perform a granular and robust analysis of the user-centric data 206, which can include information such as type of phone, call history, times of day, days of week, times of a month, etc. that the caller 104 utilizes the automated telephone attendant, weather conditions, whether a day is a holiday, service-specific data, such as services utilized or purchased by the caller 104, products owned by the caller 104, and various other information. The analyzer component 202 may dynamically determine menu options for the caller using contextual data. The organization component 106 can utilize various techniques/systems in connection with determining and outputting customized menu options to the caller 104, such as Bayesian networks, artificial neural networks, Support Vector Machines, decisions trees, quadratic classifiers, a k-Nearest Neighbor approach, etc.

Figure 5:
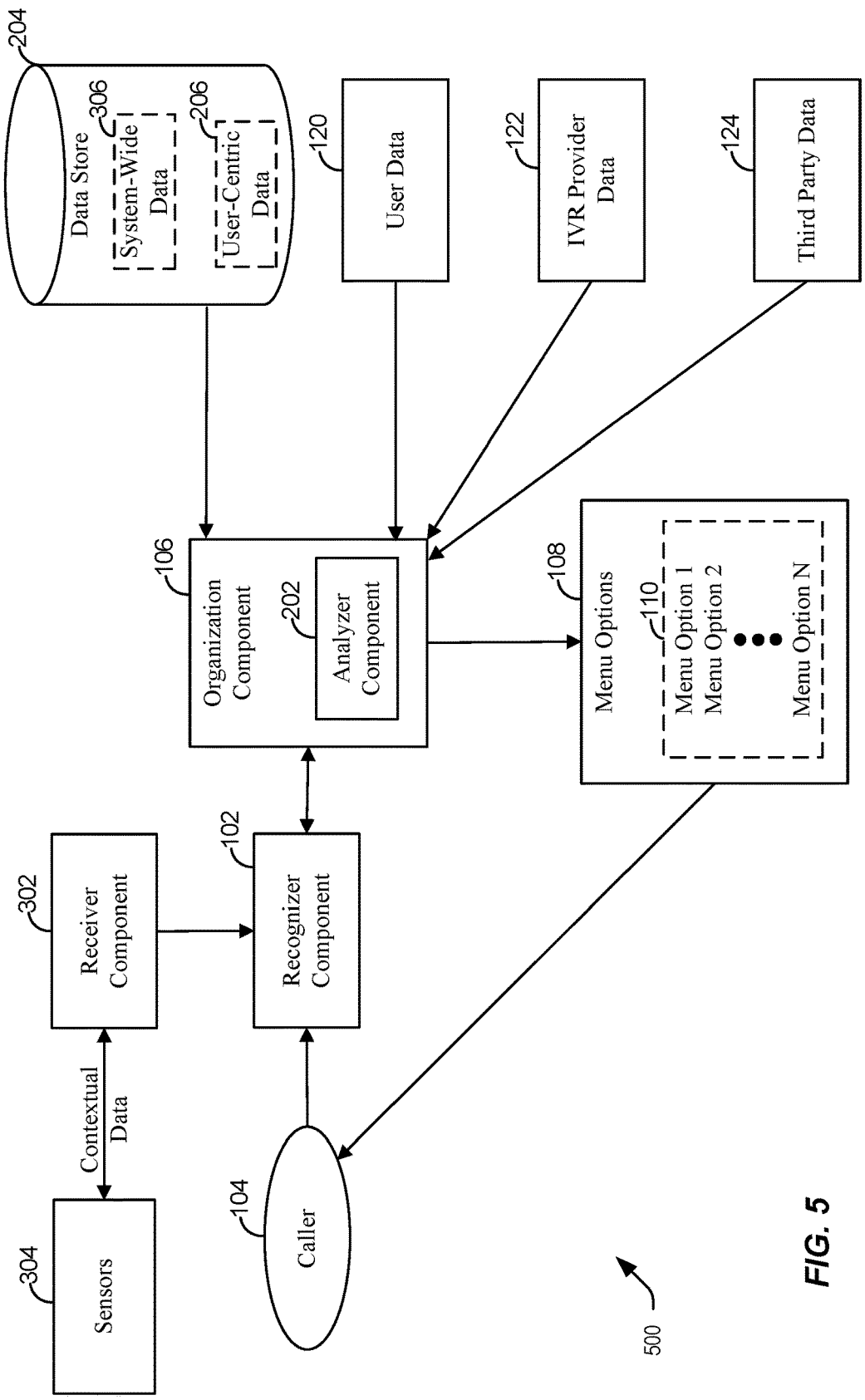
FIG. 5 illustrates a system that can be utilized in connection with an automated telephone attendant to provide customized menu options to particular callers into a customer service line.

FIG. 5 illustrates a system 500 that can be utilized in connection with an automated telephone attendant to provide customized menu options to particular callers into a customer service line. The system 500 includes the recognizer component 102, which may determine an identity of the caller 104 (or other parameters such as location of the caller 104) when the caller 104 utilizes the customer service/support telephone. For example, the recognizer component 102 may review an IP address, a RFID, a SIM card, etc. associated with a computer utilized to make the call. The system 500 may also include a receiver component 302 that receives contextual information from one or more sensors 304, where the sensors 304 can be internal to a telephone utilized by the caller 104 and/or external to the telephone. Examples of data that may be received by the receiver component 302 (and sensed by the sensors 304) include temporal data, weather conditions, a current web page that the user is accessing while making the call, a type of device utilized by the caller 104, a location of the caller 104, problems within a system (e.g., a network is down), and other data that can be sensed in real-time. The data and the caller's identity may be provided by the recognizer component 102 to the organization component 106, which may access the data store 204 and provide customized menu options 108 to the caller 104. Furthermore, if an unlikely selection from the customized menu options 108 is selected by the caller 104, the system 500 may request verification and/or learn from the selection.

The analyzer component 202 may access the data store 204 and review the user-centric data 206 with system-wide data 306 to determine an order that menu options are provided to the caller 104. For example, the system-wide data 306 may be partitioned by demographics to aid in determining an order of menu options with respect to the caller 104. If the customer service line is offered by a wireless communications company and the caller 104 is a teenager in a metropolitan area, it may be likely that the caller 104 wishes to purchase one or more ring tones (where the likelihood may be determined through analysis of the system-wide data 306). In contrast, if the caller 104 is an executive in their sixties, it is unlikely that the caller 104 will wish to purchase ring tones. Thus the analyzer component 202 may access and analyze a combination of the user-centric data 206 and the system-wide data 306 to output probabilistically determined menu options and order.

The organization component 106 may also provide other information besides menu options to the caller 104. For instance, if the caller 104 needs to speak with a human being and is placed on hold, the organization component 106 can review explicitly provided preferences or inferred preferences regarding a type of music that the caller 104 will most like to hear while on hold. Thus, the caller 104 will not be frustrated by listening to music that does not correlate with their musical tastes while on hold. As another example, no hold music may be played while the caller 104 is on hold and other intermittent feedback (e.g., visual feedback such as a flashing indicator, icon, or words and/or audio feedback such as an intermittent tone) may indicate that the caller 104 is on hold.

Figure 6:
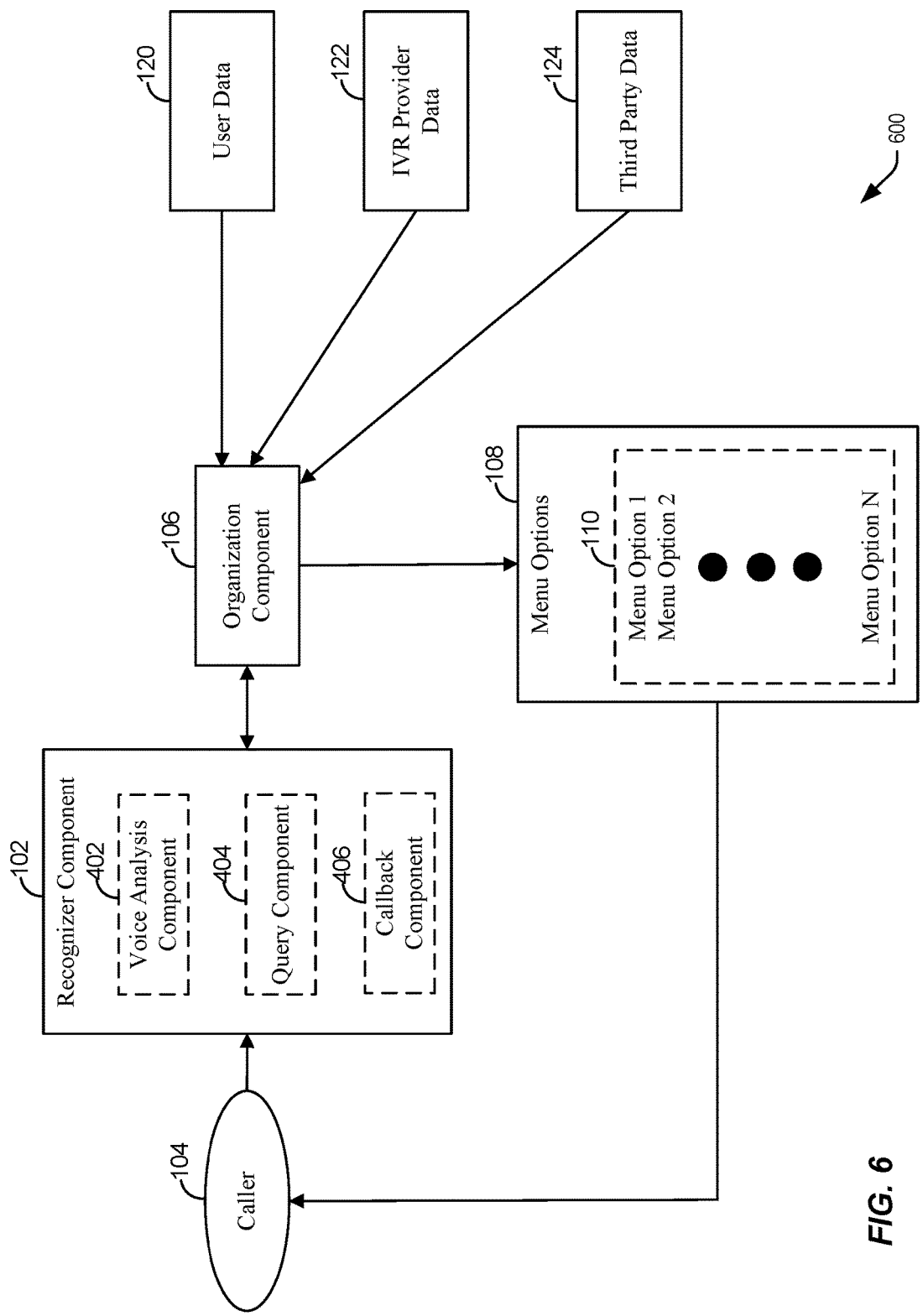
FIG. 6 illustrates a system for utilization in connection with an automated telephone attendant.

FIG. 6 illustrates a system 600 for utilization in connection with an automated telephone attendant. Components of the system 600 can be initiated when the caller 104 is connected with a customer service/support line. The system 600 includes the recognizer component 102, which can be employed to recognize an identity of the caller 104 and/or other suitable information related to the caller 104. For example, the recognizer component 102 can include a voice analysis component 402, which can analyze a voice sample from the caller 104 to discern an identity of the caller 104 amongst a plurality of other possible identities. The recognizer component 102 can utilize the voice analysis component 402 in connection with other data to reduce a set of possible identities, such as a phone number of the caller 104, a geographic location of the caller 104, etc.

Additionally or alternatively, the recognizer component 102 can include a query component 404, which can query the caller 104 for information such as a user name, a password, an account number, or other suitable information that can be utilized to determine an identity of the caller 104. For example, when the recognizer component 102 receives the call, the query component 404 can generate an audible request for identifying indicia from the caller 104. The query component 404 can then receive a response from the caller 104 and authenticate an identity of the caller 104 based upon the response. For example, the query component 404 can access a database (not shown) that enables such component 404 to authenticate an identity of the caller 104. The recognizer component 102 can additionally be associated with a callback component 406, which can identify the caller 104 by automatically calling the caller 104 on a particular number for convenience and/or security. Furthermore, it can be understood that two or more of the components 402-406 can operate in conjunction to quickly discern an identity of the caller 104.

Once the recognizer component 102 has identified the caller 104 and/or received other information related to the caller 104, the organization component 106 can output particular menu options in a specific order to the caller 104, where the menu options and order thereof are customized based upon explicitly provided or inferred preferences of the caller 104. Therefore, two different callers with different purposes for calling a customer service line can be provided with non-similar menu options in distinct orders.

Figure 7:
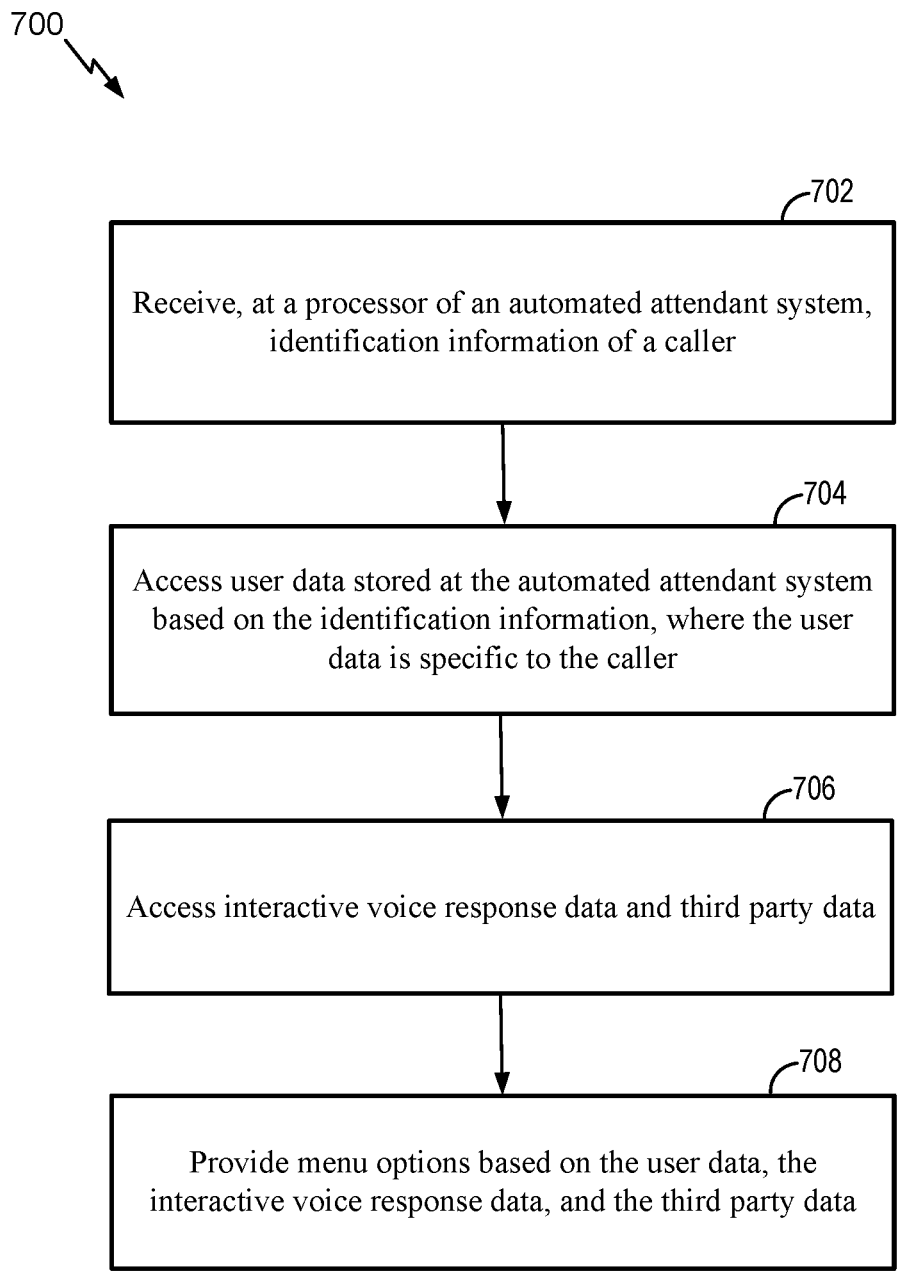
FIG. 7 illustrates a method for providing menu options to a caller.

FIG. 7 illustrates a method 700 for providing menu options to a caller. The method 700 may be performed using the system 100 of FIG. 1, the system 300 of FIG. 3, the system 400 of FIG. 4, the system 500 of FIG. 5, the system 600 of FIG. 6, or a combination thereof.

The method 700 includes receiving, at a processor of an automated attendant system, identification information of a caller, at 702. For example, referring to FIG. 3, the recognizer component 102 can, upon receipt of a call, determine an identity of the caller 104 through, for example, analysis of identification information within a caller identification line and/or utilization of voice analysis techniques. Still further, the recognizer component 102 may request and analyze personal identification numbers, account numbers, usernames, passwords, biometric indicia (such as fingerprint data obtainable through a scanning mechanism, a voice print, retinal scan, facial recognition, etc.), and other suitable information that can be utilized to identify the caller 104. Additionally, the recognizer component 102 can utilize any combination of the aforementioned techniques in connection with discerning identity of the caller 104.

User data stored at the automated attendant system may be accessed based on the identification information, at 704. The user data may be specific to the caller. For example, referring to FIG. 3, the organization component 106 may access the user data 120 based on the identification information. The user data 120 may include past requests (or choices) of the caller 104 when the caller 104 has previously accessed the system 300, a job function of the caller 104, a location of the caller 104, a demographic of the caller 104, etc. For example, the user data 120 may include caller-specific information that is provided to the organization component 106 that enables the organization component 106 to more efficiently determine menu options 108 to provide to the caller 104.

Interactive voice response data and third party data may be accessed, at 706. For example, referring to FIG. 3, the organization component 106 may access the IVR provider data 122 and the third party data 124. The IVR provider data 122 may include time-sensitive data that may be of interest to the caller 104. As non-limiting examples, the IVR provider data 122 may include outage information from a service provider, information about an overstock item offered at a discount from a retailer, etc. The third party data 124 may include local information from third-party sources, such as a news outlet, that may enable the organization component 106 to access the reason for the call. As a non-limiting example, if the system 300 is for a retail store, the third party data 124 may include weather information used by the organization component 106 to determine whether the menu options 108 should include information about sun block, umbrellas, shovels, etc.

Menu options may be provided based on the user data, the interactive voice response data, and the third party data, at 708. For example, referring to FIG. 3, based on the data 120, 122, 124, the organization component 106 may generate menu options 108, and the menu options 108 may be provided to the caller 104. Because the menu options 108 are based on user data 120 that is specific to the caller 104 and based on data 122, 124 that the organization component 106 determines to be most relevant based on current conditions (e.g., time, weather, etc.), there is a relatively high likelihood that the menu options 108 presented to the caller 104 will be relevant, which may reduce the amount of time that the caller 104 is on the telephone 130.

According to one implementation, the menu options 108 may be audibly provided to the caller 104. For example, an automated telephone attendant may audibly instruct the caller 104 to press "1" on a keypad of the telephone 130 to select Menu Option "1", to press "2" on the keypad to select Menu Option "2", etc. Additionally or alternatively, the menu options 108 may be visually provided to the caller 104. For example, the telephone 130 of the caller may include a user interface 132. The system 300 may provide a signal to the telephone 130 to visually display the menu options 108 at the user interface 132. As a result, the caller 104 may bypass waiting for the automated telephone attendant to audibly state each Menu Option and may select the desired Menu Option using the user interface 132.

Figure 8:
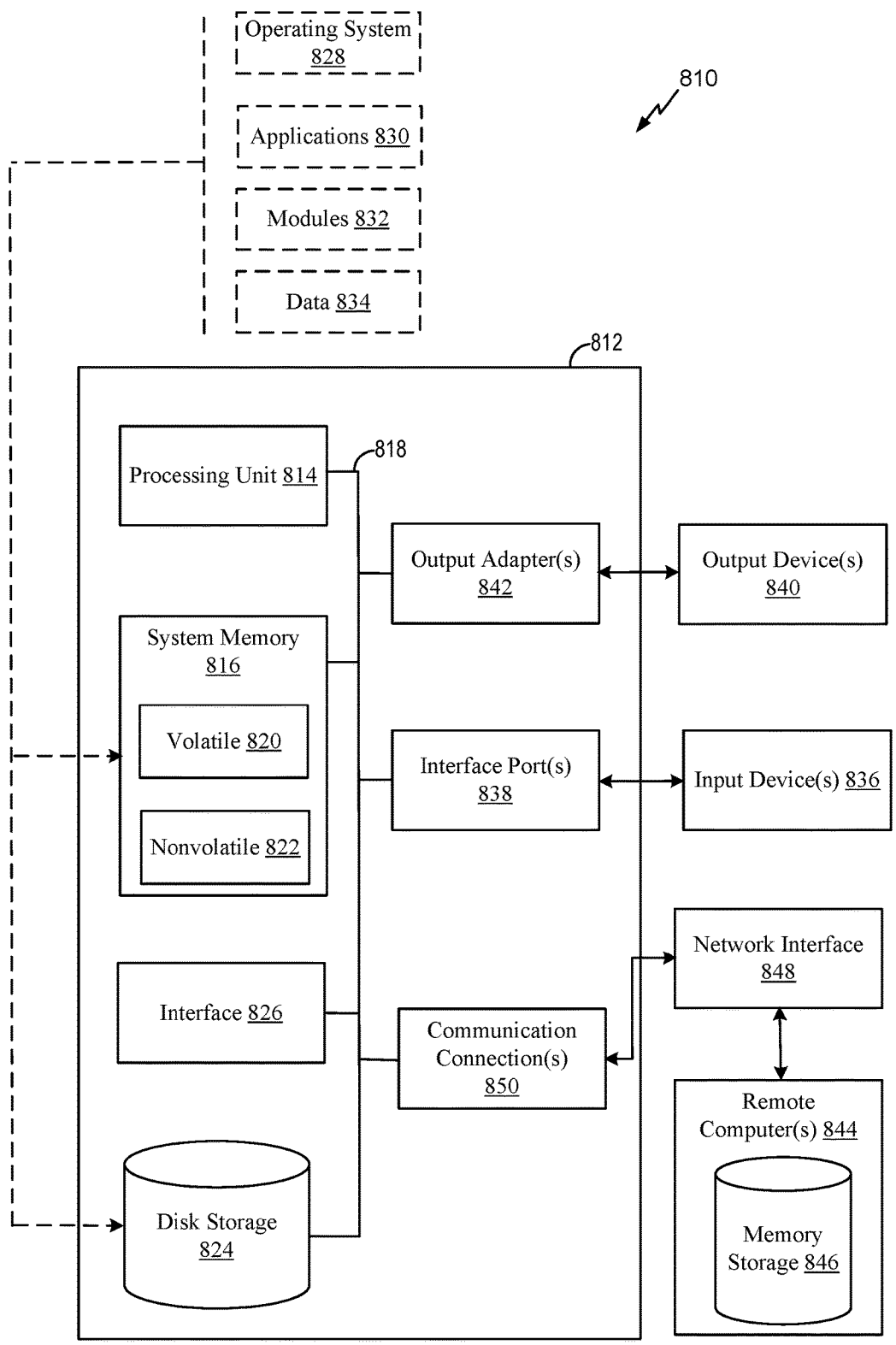
FIG. 8 illustrates an example environment for the techniques described with respect to FIGS. 1-7.

With reference to FIG. 8, an example environment 810 for implementing various aspects of the aforementioned subject matter, including selectively ordering menu options provide by an automated telephone attendant, includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures as well as a programmable gate array and/or an application-specific integrated circuit (and other devices) also can be employed as the processing unit 814.

The system bus 818 can be any of several types of bus structure(s) including the memory bus or memory controller, a peripheral bus or external bus, and/or a local bus using any variety of available bus architectures including, but no limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), Small Computer Systems Interface (SCSI), PCI Express (PCIe), and PCI Extended (PCIx).

The system memory 816 includes volatile memory 820 and/or nonvolatile memory 822. The basic input/output system (BIOS), including the basic routines to transfer information between elements within the computer 812, such as during start-up, is stored in the nonvolatile memory 822. By way of illustration, and not limitation, the nonvolatile memory 822 can include read only memory (ROM), programmable ROM (PROM), electrically programmable ROM (EPROM), electrically erasable PROM (EEPROM), or flash memory. The volatile memory 820 includes random access memory (RAM), which functions as an external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), memristors, and optical RAM.

The computer 812 also includes removable/non-removable, volatile/non-volatile computer storage media. FIG. 8 illustrates, for example, a disk storage 824. The disk storage 824 includes, but is not limited to, devices like a magnetic disk drive, floppy disk drive, tap drive, Zip drive, flash memory card, secure digital, or memory stick. In addition, the disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), a Blue Ray Drive, or an HD-DVD Drive. To facilitate connection of the disk storage devices 824 to the system bus 818, a removable or non-removable interface is typically used such as interface 826.

It is to be appreciated that FIG. 8 describes software that acts a as an intermediary between users and the basic computer resources described in the suitable operating environment 810. Such software includes an operating system 828. The operation system 828, which can be stored on the disk storage 824, acts to control and allocate resources of the computer 812. System applications 830 take advantage of the management of resources by the operating system 828 through program modules 832 and program data 334 stored either in system memory 816 or on disk storage 824. It is to be appreciated that the subject matter herein may be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, etc. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port, FireWire port, or other suitable port may be used to provide input to the computer 812, and to output information from the computer 812 to an output device 840. An output adapter 842 is provided to illustrate that there are some output devices 840 like monitors, speakers, and printers, among other output devices 840, which have special adapters. The output adapters 842 include, by way of illustration and not limitation, video and sound cards that provide a means of connections between the output device 840 and the system bus 818. It should be noted that other devices and/or systems of devices provide both input and output capabilities such as remote computer(s) 844.

The computer 812 can operate in a networked environment using logical connections to one or more remote computers, such as remote computer(s) 844. The remote computers(s) 844 can be a personal computer, a server, a router, a network PC, a workstation, a microprocessor based appliance, a peer device or other common network node, etc., and typically includes many or all of the elements described relative to the computer 812. For purposes of brevity, only a memory storage device 846 is illustrated with remote computer(s) 844. Remote computer(s) 844 is logically connected to the computer 812 through a network interface 848 and then physically connected via a communication connection 850. The network interface 848 encompasses communication networks (e.g., wired networks and/or wireless networks) such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5, etc. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside the computer 812, it can also be external to the computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
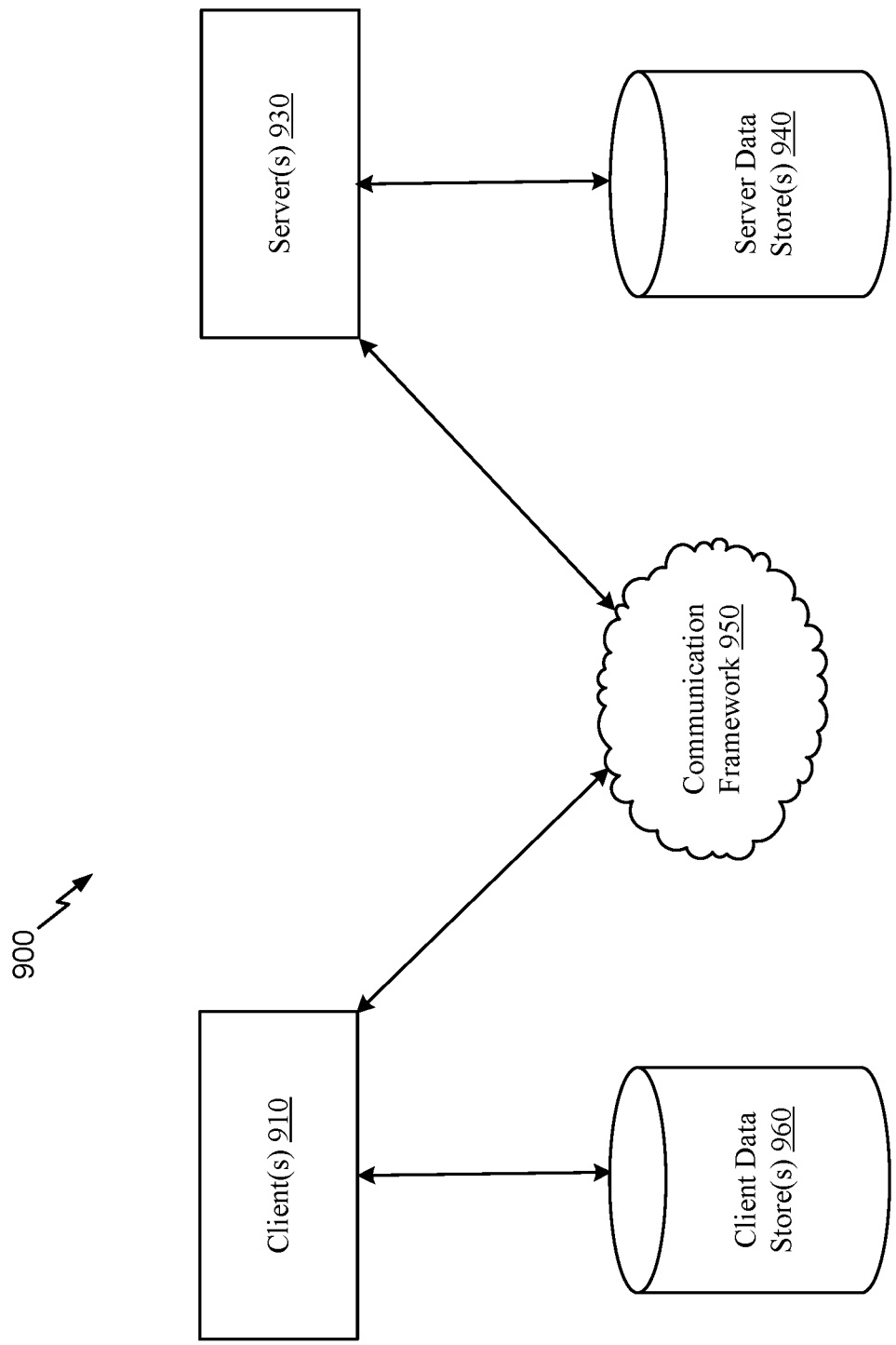
FIG. 9 is a schematic block diagram of a sample-computing environment for the techniques described with respect to FIGS. 1-7.

FIG. 9 is a schematic block diagram of a sample-computing system 900 with which the disclosed subject matter can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). One possible communication between a client 910 and a server 930 can be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

In an alternative implementation, dedicated hardware implementations, such as application specific integrated circuits, programmable logic arrays and other hardware devices, may be constructed to implement one or more of the methods described herein. Various implementations may include a variety of electronic and computer systems. One or more implementations described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various implementations of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting implementation, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations.

Less than all of the steps or functions described with respect to the exemplary processes or methods can also be performed in one or more of the exemplary implementations. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary implementations can facilitate one or more functions, where the facilitating (e.g., facilitating access or facilitating establishing a connection) can include less than every step needed to perform the function or can include all of the steps needed to perform the function.

In one or more implementations, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more implementations, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other implementations, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    scheduling, by a processor of an automated attendant system, a call back to a caller, the call back indicating a particular time when a service representative is scheduled to call a communication device associated with the caller;
    sending information indicating the particular time via a first call;
    after ending the first call, receiving an availability flag associated with the call back from the communication device, the availability flag indicating whether the caller is available to receive a call from the service representative, wherein the availability flag is based on a distance between the communication device and a second device associated with the communication device; and
    generating a call back signal based on the availability flag, the call back signal indicating to the service representative whether to initiate a second call corresponding to the call back at the particular time, wherein the distance corresponds to a distance before the call back signal is generated.

2. The method of claim 1, wherein the second device is unable to receive the second call.

3. The method of claim 1, wherein the availability flag indicates that the caller is available to receive the call when the communication device is not associated with a call session.

4. The method of claim 1, wherein the availability flag indicates that the caller is not available to receive the call when the communication device is associated with a call session.

5. The method of claim 1, further comprising determining, by the processor of the automated attendant system, whether the caller is available to receive a call from the service representative based on the availability flag, wherein, when the communication device is associated with a call session, the availability flag indicates that the communication device is associated with the call session and indicates a priority value associated with the call session, and wherein the processor determines whether the caller is available based on the priority value.

6. The method of claim 1, further comprising:
    receiving identification information of the caller;
    accessing user data stored at the automated attendant system based on the identification information, wherein the user data is specific to the caller;
    providing, to the communication device, menu options based on the user data; and
    determining whether the service representative is available to speak with the caller based on a user selection of a particular menu option of the menu options.

7. The method of claim 1, further comprising determining the particular time based on historical data associated with the service representative.

8. The method of claim 1, wherein the second device is a wearable mobile device associated with the caller.

9. The method of claim 1, wherein the availability flag indicates that the caller is not available when the distance satisfies a threshold distance.

10. An automated attendant system comprising:
    a processor; and
    a memory storing instructions executable by the processor to perform operations comprising:
        scheduling a call back to a caller, the call back indicating a particular time when a service representative is scheduled to call a communication device associated with the caller;
        sending information indicating the particular time via a first call;
        after ending the first call, receiving an availability flag associated with the call back from the communication device, the availability flag indicating whether the caller is available to receive a call from the service representative, wherein the availability flag is based on a distance between the communication device and a second device associated with the communication device; and
        generating a call back signal based on the availability flag, the call back signal indicating to the service representative whether to initiate a second call corresponding to the call back at the particular time, wherein the distance corresponds to a distance before the call back signal is generated.

11. The automated attendant system of claim 10, wherein the availability flag is received using in-band signaling.

12. The automated attendant system of claim 10, wherein the availability flag indicates that the caller is available to receive the call when the communication device is not associated with a call session.

13. The automated attendant system of claim 10, wherein the availability flag indicates whether the caller is available or unavailable to receive the call as determined by the communication device.

14. The automated attendant system of claim 10, wherein the operations further include determining whether the caller is available to receive a call from the service representative based on the availability flag, wherein, when the communication device is associated with a call session, the availability flag indicates that the communication device is associated with the call session and indicates a priority value associated with the call session, wherein determining whether the caller is available is based on the priority value, and wherein the caller is determined unavailable to receive the call responsive to the priority value indicating a high priority.

15. The automated attendant system of claim 10, wherein the operations further comprise:
    receiving identification information of the caller;
    accessing user data stored at the automated attendant system based on the identification information, wherein the user data is specific to the caller;
    providing, to the communication device, menu options based on the user data; and determining whether the service representative is available to speak with the caller based on a user selection of a particular menu option of the menu options.

16. The automated attendant system of claim 10, wherein the particular time is selected based on historical data.

17. A computer-readable hardware storage device comprising instructions that, when executed by a processor of an automated attendant system, cause the processor to perform operations comprising:

scheduling a call back to a caller, the call back indicating a particular time when a service representative is scheduled to call a communication device associated with the caller;

sending information indicating the particular time via a first call;

after ending the first call, receiving an availability flag associated with the call back from the communication device, the availability flag indicating whether the caller is available to receive a call from the service representative, wherein the availability flag is based on a distance between the communication device and a peripheral second device associated with the communication device; and generating a call back signal based on the availability flag, the call back signal indicating to the service representative whether to initiate a second call corresponding to the call back at the particular time, wherein the distance corresponds to a distance before the call back signal is generated.

18. The computer-readable storage device of claim 17, wherein the availability flag is received using out-of-band signaling.

19. The computer-readable storage device of claim 17, wherein the availability flag indicates that the caller is available to receive the call when the communication device is not associated with a call session and the distance does not satisfy a threshold distance.

20. The computer-readable storage device of claim 17, wherein the availability flag indicates that the caller is not available to receive the call when the communication device is associated with a call session.

* * * * *